United States Patent [19]

Sheldon

[11] Patent Number: 5,327,141
[45] Date of Patent: Jul. 5, 1994

[54] CLUTTER REMOVAL BY POLYNOMIAL COMPENSATION

[75] Inventor: Edward J. Sheldon, Lexington, Mass.

[73] Assignee: Raytheon Company, Lexington, Mass.

[21] Appl. No.: 927,612

[22] Filed: Nov. 6, 1986

[51] Int. Cl.$^5$ ............................................. G01S 13/534
[52] U.S. Cl. ...................................... 342/159; 342/195
[58] Field of Search .................................. 342/159, 195

[56] References Cited

U.S. PATENT DOCUMENTS 3,220,002 11/1965 Shrader .
3,706,095 11/1970 Cherwek .
3,742,500 6/1973 Freedman .
4,117,538 9/1978 Shrader et al. .
4,510,944 4/1985 Porges .
4,559,537 12/1985 Pearson, Jr. et al. .

OTHER PUBLICATIONS

"On the Use of Windows for Harmonic Analysis with the Discrete Fourier Transform", by Fredric J. Harris, Proceedings of the IEEE, vol. 66, No. 1, Jan. 1978, pp. 51–85.

Primary Examiner—Gilberto Barrón, Jr.
Attorney, Agent, or Firm—Donald F. Mofford; Richard M. Sharkansky

[57] ABSTRACT

Apparatus and method for removing unwanted components of a signal received from a radar transmitter. The unwanted components lie in a clutter Doppler frequency band. Such components are removed by first sampling the received signal at a rate sufficient to cause components of the received signal in the clutter Doppler frequency band to be validly sampled and components of the received signal in a desired target Doppler frequency band to be invalidly sampled. A signal equivalent to the values of a polynomial fit to this sampled signal then provides an estimate of the unwanted clutter components. This estimate is subtracted from the original received signal to provide a signal with the unwanted clutter components removed. A significant improvement in receiver sensitivity as well as a reduction in dynamic range requirements of a post detection digital signal processor is achieved through the use of this invention.

10 Claims, 5 Drawing Sheets

```
117         SUBROUTINE CUBE (ZWORK, M)
118 C
119 C     THIS SUBRTN DOES CUBIC FIT TO 4 POINTS
120 C     IN REAL AND IMAG SPACE SEPERATELY, AND SUBTRACTS
121 C     FITTED CURVES FROM INPUT DATA AND REPLACES
122 C     ORIGINAL COMPLEX VECTOR WITH THE COMPLEX RESIDUE.
124 C
125         IMPLICIT REAL (K)
126 C
127         COMPLEX ZWORK (*), Y,K0,K1,K2,K3
128 C         CUBIC CORRECTION FACTORS, ETC.
129 C
130         COMMON /KSTORE/ KC0F1, KC0F2, KC0F3, KC0F4,
131        +                KC1F1, KC1F2, KC1F3, KC1F4,
132        +                KC2F1, KC2F2, KC2F3, KC2F4,
133        +                KC3F1, KC3F2, KC3F3, KC3F4,
134        +                NCS1,  NCS2,  NCS3,  NCS4, IKFLAG
135 C
136         IF ( IKFLAG +NE+ 1 ) THEN
137 C                           COMPUTE COEFFICIENTS FOR THIS RUN
138            IKFLAG = 1
139            NT=M/3
140            NCS1=1
141            NCS2=1-NT
142            NCS3=M-NT
143            NCS4=M
144            A=0+5*(M-1)
145            B=0+5*(M-2*NT-1)
146            RAB=0+5/(A**2-B**2)
147 C
148            KC0F1 = RAB * (0+-B**2)
149            KC0F2 = RAB * (    A**2)
150            KC0F3 = RAB * (    A**2)
151            KC0F4 = RAB * (0+-B**2)
152 C
153            RABB = RAB/(A*B)
154            KC1F1 = RABB * (    B**3)
155            KC1F2 = RABB * (0+-A**3)
156            KC1F3 = RABB * (    A**3)
157            KC1F4 = RABB * (0+-B**3)
158 C
159            KC2F1 = KC2F4 = RAB
160            KC2F2 = KC2F3 = 0+-RAB
161 C
162            KC3F1 = RABB * (0+-B)
163            KC3F2 = RABB * (    A)
164            KC3F3 = RABB * (0+-A)
165            KC3F4 = RABB * (    B)
166 C          END CUBIC FACTORS GENERATION
167 C
168         END IF
169 C
170 C       CUBIC DWELL COEFF GENERATION
171         K0=KC0F1*ZWORK(NCS1)+KC0F2*ZWORK(NCS2)
172        +    +KC0F3*ZWORK(NCS3)+KC0F4*ZWORK(NCS4)
173         K1=KC1F1*ZWORK(NCS1)+KC1F2*ZWORK(NCS2)
174        +    +KC1F3*ZWORK(NCS3)+KC1F4*ZWORK(NCS4)
175         K2=KC2F1*ZWORK(NCS1)+KC2F2*ZWORK(NCS2)
176        +    +KC2F3*ZWORK(NCS3)+KC2F4*ZWORK(NCS4)
177         K3=KC3F1*ZWORK(NCS1)+KC3F2*ZWORK(NCS2)
178        +    +KC3F3*ZWORK(NCS3)+KC3F4*ZWORK(NCS4)
179            DO 1500 I=1, M
180               X=I-0+5*(M+1)
181               Y=K0+X*(K1+X*(K2+X*K3))
182               ZWORK(I)=ZWORK(I)-Y
183 1500       CONTINUE
184 C
185 C
186         RETURN
187         END
```

FIG. 4

CLUTTER REMOVAL BY POLYNOMIAL COMPENSATION

BACKGROUND OF THE INVENTION

The present invention relates generally to radar receivers, and more particularly to a method and apparatus for distinguishing between signals received from a desired target and those received from unwanted clutter.

It is well known that radars operate by transmitting a signal at a radio frequency (hereinafter referred to as the transmitted signal). The transmitted signal is reflected by a target and returned as a received signal. A received signal returned by a target moving radially with respect to the radar transmitter has a frequency different from that of the transmitted signal. The difference between the frequency of the transmitted signal and the received signal, known as the Doppler shift frequency, may be used to determine the range rate between the target and the transmitter. If several targets having different range rates are illuminated by the transmitted signal, the resulting received signals returned by each target are distributed within a band of Doppler shift frequencies. The location of the received signal returned by each target within the Doppler frequency band is thus a function of the range rate of the associated target. If the range rate of a particular desired target is greater (or less) than the range rate of certain other undesired targets, filtering techniques may be used to separate the received signal returned from the particular desired target from the received signals returned from undesired targets.

A problem occurs when the Doppler frequency of a desired target is close to the undesired target's Doppler frequency. This is particularly troublesome when the undesired targets include ground clutter, as received signals returned from ground clutter are often much more powerful than received signals returned from desired targets. In radars using a transmitted signal of the continuous wave (CW) type, one way to improve operation has been to use a bandpass filter with a passband including the expected Doppler frequency of a desired target and stopband which includes the expected Doppler frequency of the clutter. Sometimes both conditions cannot be met simultaneously. This may occur when detectability of hovering or low radial velocity objects such as helicopters is important. If digitally implemented, such bandpass filters often require the use of weighting having extremely low side lobes, such as the Blackman-Harris weighting described in Harris, F., "On the Use of Windows For Harmonic Analysis With a Discrete Fourier Transform", in *Proceedings of the IEEE*, vol. 66, No. 1, January 1978. The use of such weighting reduces sensitivity because the main lobe of the filter's frequency response becomes wider, and because a 3 db processing loss is introduced.

For radars using a pulsed transmitted signal, an additional disadvantage exists if the bandpass filter technique is used. Because such a filter normally has a relatively narrow bandwidth to effect the desired discrimination between desired and undesired signals, its temporal response will be longer than the duration of any return signal. This in turn has a negative effect on range resolution and detectability of targets at short range. One prior solution to this problem has been to use range gates to quantize the return signal into range intervals. U.S. Pat. No. 3,706,095 to Cherwek is an example of such a system where the return signal is first range gated before being fed to a bandpass filter. If range gates are used, they normally must be applied after detecting the pulsed transmitted signal, because clutter created at the harmonics of the code or pulse repetition interval will not otherwise be removed.

It is also known that improved performance can be achieved by using an adaptive filter to center the clutter stopband at the average clutter Doppler frequency within selected range cells. See for example U.S. Pat. No. 3,742,500 to N. Freedman and U.S. Pat. No. 3,987,442 to McLeod, Jr. The use of such adaptive filters requires an attendant increase in design complexity and cost.

SUMMARY OF THE INVENTION

With the foregoing background of the invention in mind, it is a general object of the present invention to improve the detectability of small desired targets in the presence of powerful ground clutter in CW or coded CW radar systems.

A further object of the present invention is to allow the use of lower loss yet higher side lobe weighting functions to improve detectability of small targets.

Yet another object is to reduce the power of unwanted clutter signals relative to desired target signals, thereby allowing a red action in the number of bits required in an accompanying digital signal processor.

A still further object is to accomplish the above without the disadvantages of bandpass filters and adaptive pulse cancellets.

Briefly, the foregoing and other objects are accomplished by providing samples of a received signal at a sampling rate sufficient to validly sample components of the received signal in a clutter Doppler frequency band, but lower than a sampling rate sufficient to validly sample components of the received signal in a target Doppler frequency band. A signal substantially equal to the values of a polynomial fit to a subset of the received signal samples is generated, to provide an approximation of the components of the received signal in the clutter Doppler frequency band. A subtractor connected to the received signal and the approximation provides an estimate of the components of the received signal in the desired target Doppler band. In a preferred embodiment, a cubic polynomial approximation has been found to work well. The cubic approximation is preferably calculated by solving a set of four simultaneous equations.

BRIEF DESCRIPTION OF THE DRAWINGS

The foregoing and other objects, advantages and novel features of the present invention will become apparent from the following detailed description when considered together with the accompanying drawings, in which:

FIG. 4 is a listing of an exemplary computer program that can be used to implement the present invention in a microprocessor system.

DETAILED DESCRIPTION OF THE PREFERRED EMBODIMENTS

Figure 1:
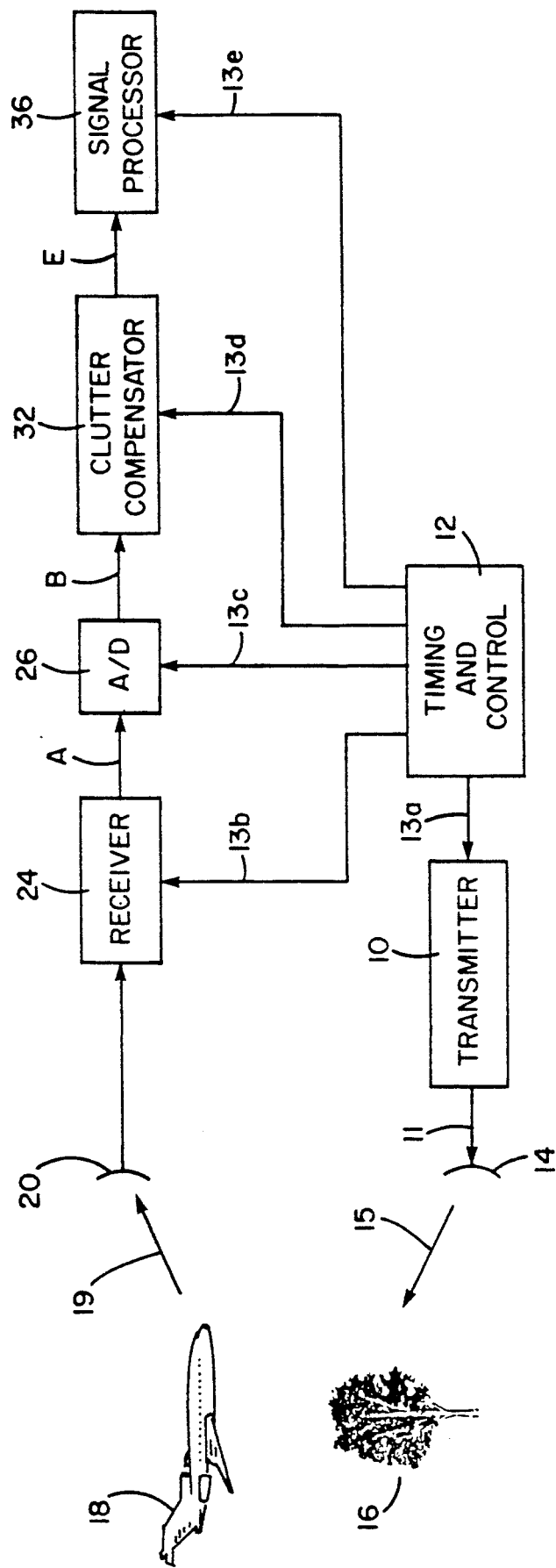
FIG. 1 is a block diagram of a radar system incorporating the present invention.

Referring now to the drawings, in which like reference characters designate like or corresponding parts or signals throughout the several views, there is shown in FIG. 1 a block diagram of a radar system comprising a transmitter 10, timing and control circuit 12, transmitting antenna 14, receiving antenna 20, receiver 24, analog-to-digital (A/D) converter 26, a clutter compensator 32 according to the present invention and signal processor 36. The system of FIG. 1 represents a phase coded continuous wave (CW) radar system, although it is to be understood that the present invention may be adapted for use in other systems such as uncoded CW or pulsed radars.

Timing and control circuit 12 provides reference signals 13a-13e to drive the various components of the radar system in synchronism. In a conventional manner, transmitter 10 uses at least one reference signal 13a to provide a phase modulated radio frequency (RF) transmitted signal 11. Transmitted signal 11 is then fed to transmitting antenna 14. Transmitting antenna 14 is preferably of the rotating type which scans all or part of the horizon. As transmitting antenna 14 scans the horizon, a received signal 19 is reflected by objects within the operating range of the radar system, the objects including, for example, both a desired moving target 18 shown as an aircraft and undesired ground clutter 16 such as trees or other stationary objects. Received signal 19 is then received by receiving antenna 20. It is to be understood that while transmitting antenna 14 and receiving antenna 20 are shown separately, a single antenna may be alternatively used. In conventional fashion, receiver 24 heterodynes the output from receiving antenna 20 with at least one reference signal, 13b, to produce a received signal A. A/D converter 26 in turn produces discrete time samples of received signal A, as a sampled received signal B. In accordance with the present invention, clutter compensator 32 then removes components of the sampled received signal B due to clutter 16 providing a clutter compensated signal E. Clutter compensated signal E is in turn fed to signal processor 36, for performing additional analysis such as a discrete Fourier transform to determine Doppler frequencies and other information of interest.

Figure 2:
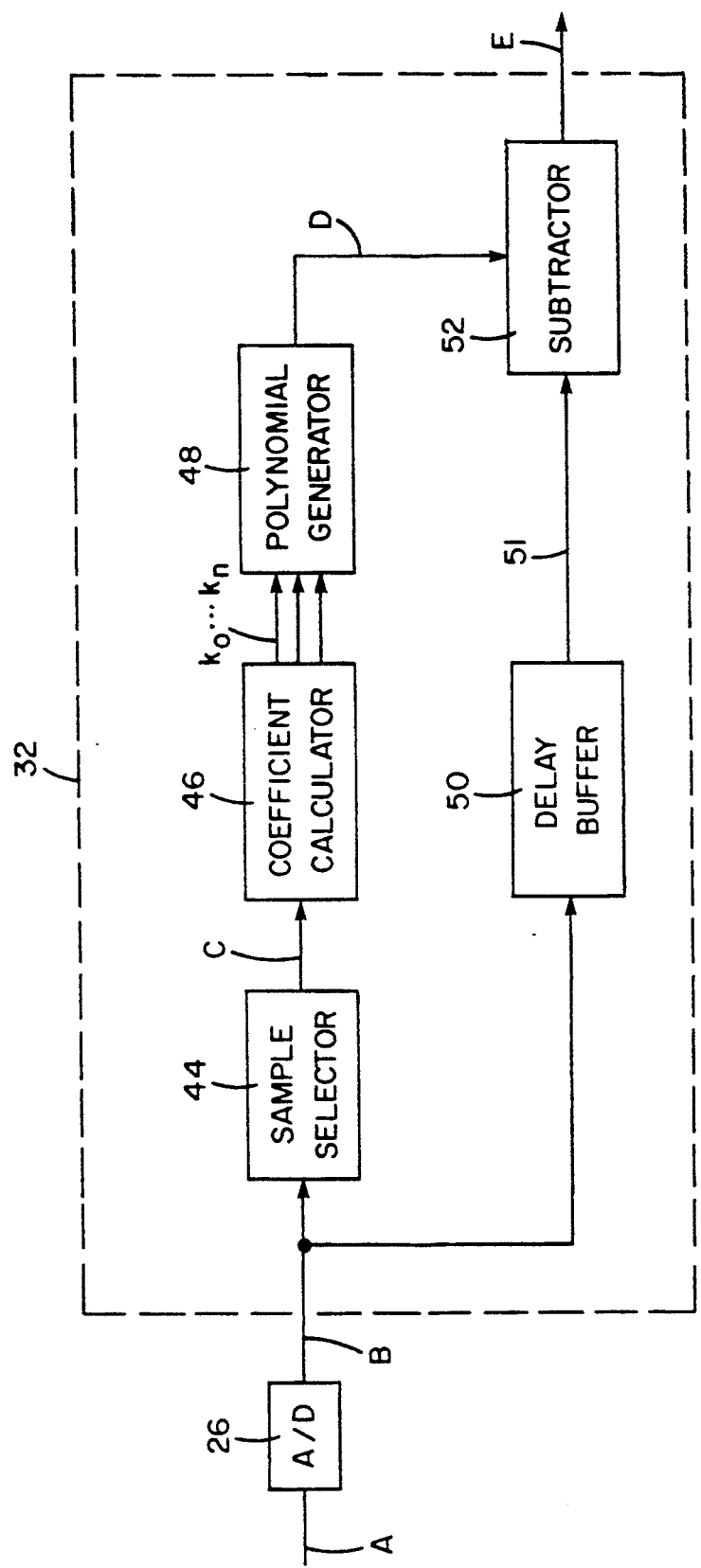
FIG. 2 is a more detailed block diagram of a clutter compensator used in the system of FIG. 1.

Referring now to FIG. 2, there is shown A/D converter 26 and in greater detail a block diagram of a preferred embodiment of clutter compensator 32. In accordance with the present invention, clutter compensator 32 comprises sample selector 44, coefficient calculator 46, polynomial generator 48, delay buffer 50 and subtractor 52.

Figure 3A:
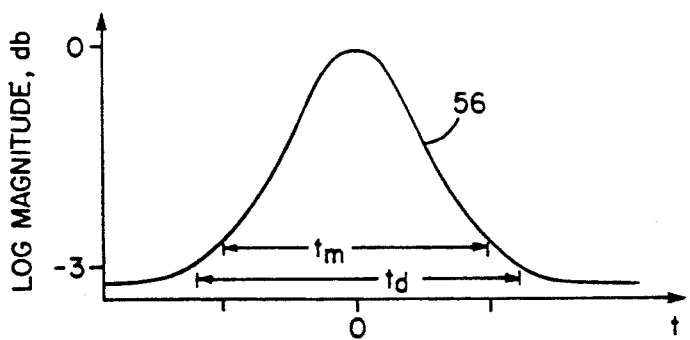
FIGS. 3A-3E represent signals typically present at the points A through E of FIGS. 1 and 2.

Before proceeding to a discussion of the details of operation of clutter compensator 32, it is instructive to consider a typical received signal A at the input of A/D converter 26. A portion of such a typical received signal A is shown in FIG. 3A. The horizontal axis is time and the vertical axis is magnitude. Shown is a single envelope portion 56 of received signal A; however, it should be understood that received signal A comprises many such portions created as transmitting antenna 14 (of FIG. 1) repeatedly scans past target 18 and/or clutter 16. The shape of the envelope 56 is primarily determined by scan modulation imparted by the beam of transmitting antenna 14 and receiving antenna 20 as they rotate. Because target 18 is moving, received signal A contains modulation at the Doppler frequency of target 18 (not shown). Radar signals such as received signal A are often characterized by their dwell period, defined as the time difference between the two half-power or −3 db points of the envelope 56. This measurement indicates how long the radar system is looking at, or dwelling on, a particular target. In FIG. 3A, this dwell period is indicated as $t_d$. In practice, however, many radar systems divide their processing time into periods smaller than $t_d$, often called mini-dwell periods. The mini-dwell time period is denoted as $t_m$ in FIGS. 3A through 3E. The midpoint of the mini-dwell is labeled t=0 for convenience in the following discussion. It should be understood, however, that envelope 56 may occur at any time, and have any position relative to the center of a particular mini-dwell period.

Figure 3B:
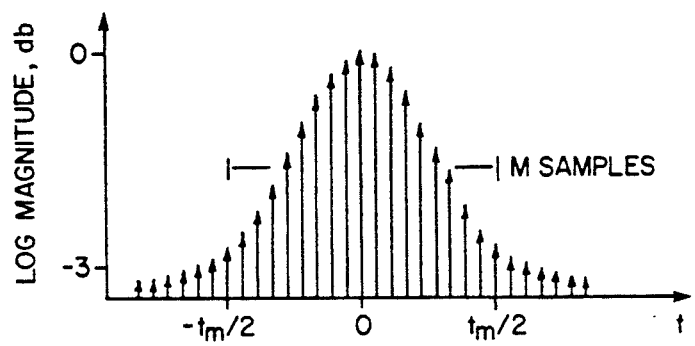

Turning attention back to FIG. 2, A/D converter 26 provides discrete time samples of received signal A. Thus, A/D converter 26 provides at its output a sampled received signal B. As shown in FIG. 3B, this sampled received signal comprises an integral number of samples, M, taken during each mini-dwell period. In the preferred embodiment, the mini-dwell period is set to approximately one-half the dwell period. The M samples are taken at a rate equal to or greater than the minimum necessary sampling frequency, as defined by the well known Nyquist criterion, i.e., two times the maximum expected frequency component of received signal A.

The M samples taken during each mini-dwell period are then processed by clutter compensator 32 together, but separately from the M samples taken during the prior or following mini-dwell period. Returning attention to FIG. 2, it can be seen that sampled received signal B output from A/D converter 26 is fed to both sample selector 44 and delay buffer 50. Buffer 50 serves to store sampled received signal B, if necessary, during the operation of sample selector 44, coefficient calculator 46 and polynomial generator 48. Sample selector 44 then proceeds to select a discrete number, N, where N is less than M, samples of sampled received signal B. The exact number of samples taken depends upon the shape of the envelope 56, the order of polynomial fit found to model the envelope 56 accurately enough, and the relative target, clutter, and noise power ratios. These N samples are preferably selected so as to be evenly spaced in time during each mini-dwell period, with their spacing being (N−1) divided by $t_m$.

Figure 3C:
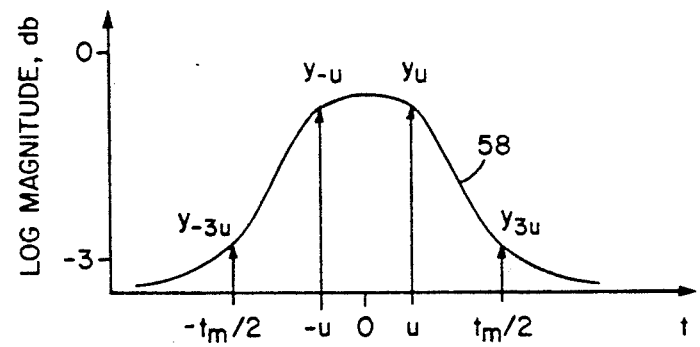
Figure 3D:
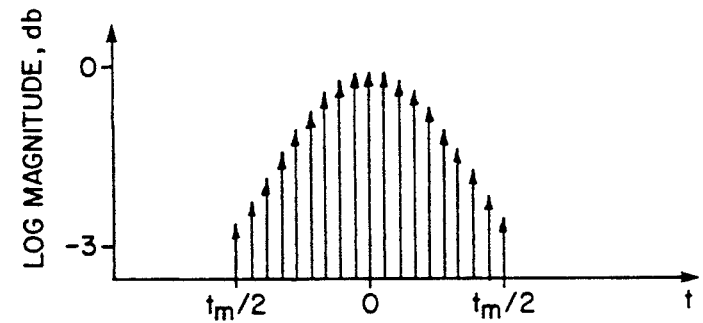

It has been found that envelope 56 can be accurately modeled by a cubic polynomial equation. Thus, in the preferred embodiment sample selector 44 selects four (one more than the order of the cubic polynomial to be fit) samples of sampled received signal B evenly spaced across the mini-dwell period, $t_m$, thereby producing selected signal C. As shown in FIG. 3C, selected signal C comprises four samples taken with spacing 2 u, where $u=t_d/6$. The four samples taken at times −3 u, −u, u, and 3 u have magnitudes $y_{-3u}$, $y_{-u}$, $y_u$, and $y_{3u}$, respectively. Those of skill in the art will recognize that this reduced number of samples, N, taken during the mini-dwell period results in undersampling or aliasing of received signal B. While this normally has a detrimental effect on the quality of subsequent signal processing, as frequency components above one-half the sampling frequency are redistributed below one-half the sampling frequency, in the embodiment presently being described, it is preferred that such undersampling indeed occur at the output of sample selector 44. The reason for this is that Doppler frequency components of received signal B returned from desired target 18 are much smaller in magnitude than the Doppler frequency components returned from clutter 16. So, while this undersampling causes target frequency components to be redistributed into the range where clutter frequency components are thereby distorting the clutter estimate somewhat, this distortion is minimal. Thus, it has been discovered that a sufficient estimate of the clutter frequency components is obtained by sampling at a rate lower than the lowest expected target frequency component. The number N is thus chosen so that the effective sampling rate $N/t_m$ of aliased received signal C is at least twice the highest expected Doppler frequency component of clutter 16, while being less than twice the lowest expected Doppler frequency component of desired target 18.

As shown in FIG. 2, selected signal C is in turn fed to coefficient calculator 46, for determining the coefficients of a polynomial that fits the samples selected by sample selector 44. This polynomial is graphically illustrated in FIG. 3C by curve 58. In the case of the preferred embodiment, coefficient calculator 46 finds the four coefficients $k_3, k_2, k_1, k_0$ that solve a system of four equations in four unknowns defined by the four known points on curve 58:

$$k_3(-3u)^3 + k_2(-3u)^2 + k_1(-3u) + k_0 = y_{-3y}$$

$$k_3(-u)^3 + k_2(-u)^2 + k_1(-u) + k_0 = y_{-u}$$

$$k_3(u)^3 + k_2(u)^2 + k_1(u) + k_0 = y_u$$

$$k_3(3u)^3 + k_2(3u)^2 30\ k_1(3u) + k_0 = y_{3u}$$

Returning attention to FIG. 2, it is seen that coefficients $k_3, k_2, k_1$, and $k_0$, once calculated, are then input to polynomial generator 48 for solving these equations at the M values of t between $-t_m/2$ and $+t_m/2$ where samples were taken by sampler 26. The output of polynomial generator 48, clutter estimate signal D, thus appears as in FIG. 3D, which represents the M values of the polynomial fit to selected signal C.

Figure 3E:
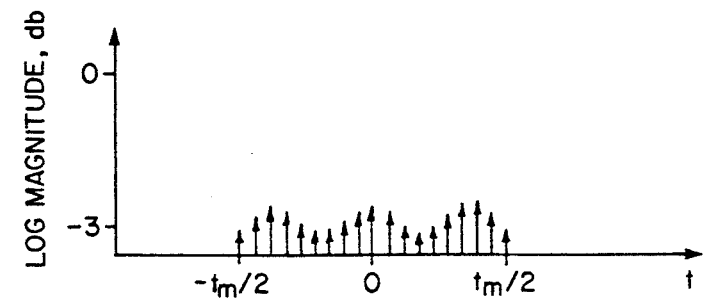

Finally, clutter estimate signal D is fed to subtractor 52 which also receives the output 51 of delay buffer 50. As previously mentioned, the output 51 of buffer 50 is a delayed version of sampled received signal B. The output of subtractor 52 is clutter compensated signal E, which represents the difference between signals B and D. For example, if sampled received signal B contained components due to reflections from both a single desired target 18 and clutter 16, clutter compensated signal E appears as shown in FIG. 3E as a sine wave at the Doppler frequency of the single desired target 18.

In one preferred embodiment, clutter compensator 32 is implemented in a conventional computer system programmed to perform the operations of sample selector 44, coefficient calculator 46, polynomial generator 48, delay buffer 50 and subtractor 52. An exemplary FORTRAN subroutine performing these operations appears in FIG. 4. Before this subroutine is executed, M samples of received signal B are input to the computer from A/D converter 26 and stored in memory locations addressable by the variable ZWORK. Some of the operations of sample selector 44 and coefficient calculator 46 are carried out in lines 139-165. More particularly, as these operations depend on the number of samples, M, in a mini-dwell period and the sample spacing selected, they need only be carried out once for a particular radar system configuration. Thus, if the clutter compensator 32 is to be used with only one radar system, these operations may be performed off-line and the results stored as constants in a non-volatile Read-Only Memory portion of the computer system. Lines 171-178 of the program in FIG. 4 perform the remaining functions of sample selector 44 and coefficient calculator 46 by calculating the coefficients $k_0, k_1, k_2$ and $k_3$. These coefficient calculating steps use the constants calculated in lines 138-165. The DO loop at lines 179-183 performs the remaining operations of polynomial generator 48, delay buffer 50 and subtractor 52. Polynomial generator 48 is implemented by executing lines 180 and 181 for each one of the M samples of sampled received signal B. The value of the current sample of clutter estimate signal D is then temporarily stored in variable Y. Delay buffer 50 is implemented by calculating variable Y before performing the operation of subtractor 52, as in line 182.

Figure 5A:
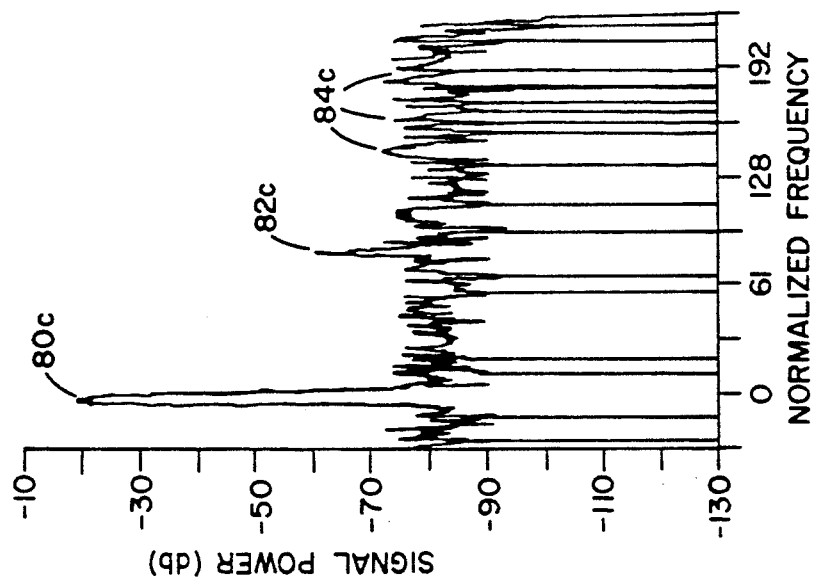
FIGS. 5A-5C show an effect of using the clutter compensator of FIG. 2.
Figure 5B:
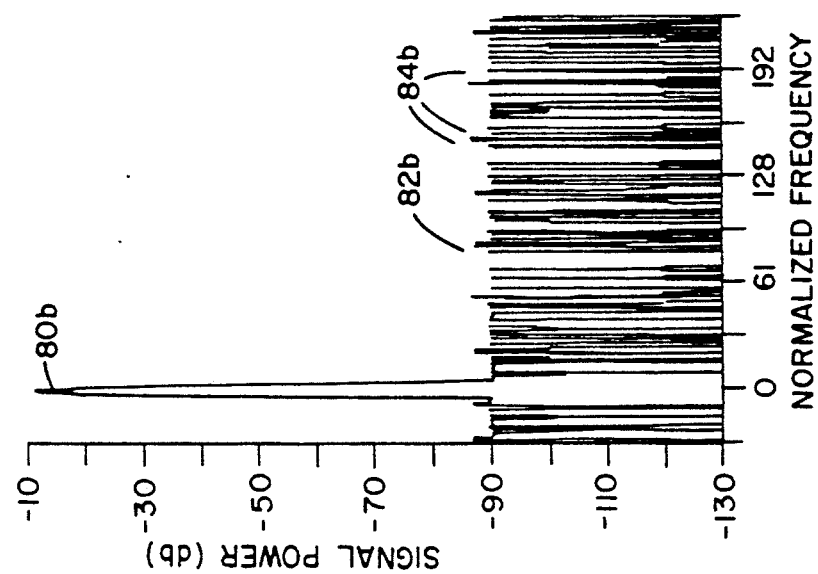
Figure 5C:
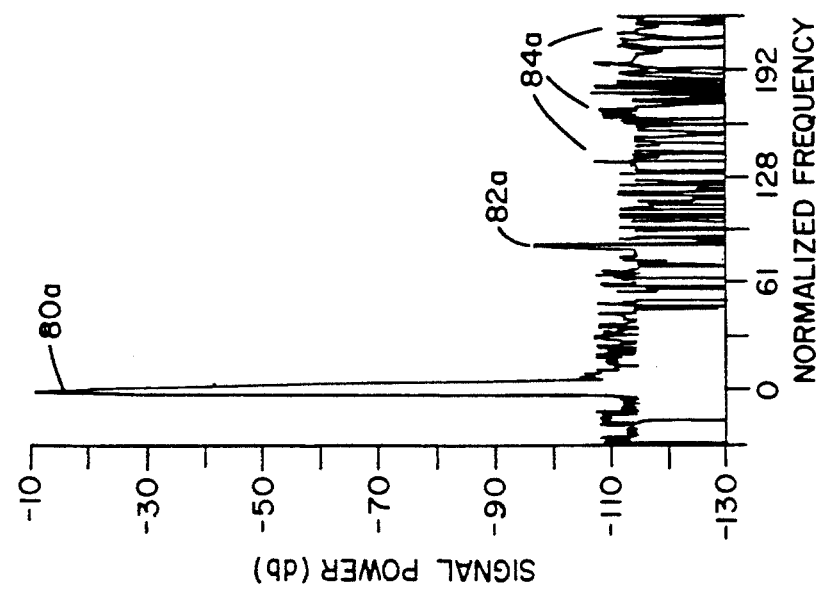

An example of the advantages obtainable by using the clutter compensator of the present invention is shown in FIGS. 5A, 5B and 5C. FIG. 5A is a plot of the discrete Fourier transform (DFT) of another sampled received signal B available at the output of A/D converter 26 of FIG. 2. In particular, FIG. 5A shows a signal having a clutter component 80a approximately 85 db above the power of moving target component 82a with a normalized Doppler frequency of approximately 86. The average noise components are approximately 4 db below the power of the moving target component 82A, as indicated by numeral 84a. The DFT of FIG. 5A was calculated using 20 bit arithmetic accuracy. FIG. 5B is a plot of the same sampled echo signal, with the only difference being that the DFT was calculated using 16 bit arithmetic. In this instance, the moving target component 82b is approximately the same magnitude as noise components 84b. A detection threshold would have to be set at some level higher than $-88$ db and target discrimination capability has been lost.

However, if the sampled received signal B is first input to clutter compensator 32, different results are obtained. In FIG. 5C is shown the DFT of clutter compensated signal E. For this FIGURE, clutter compensator 32 used the preferred cubic polynomial to fit the sampled echo signal. The arithmetic in clutter compensator 32 and the DFT was performed with an accuracy of 16 bits. As is evident, the relative power of clutter component 80c to target component 82c has been reduced significantly, so that the digital words comprising clutter compensated signal E can be scaled (in this instance by a factor of $2_6$ or equivalently a 6 bit left shift of each word). The 16 bit DFT is now sufficient to allow discrimination between moving target component 82c and noise component 84c, by placing a threshold at approximately $-70$ db.

While various embodiments of the present invention have been shown and described above, it will be obvious to those of skill in the art that many adaptations may be made without departing from the spirit of the inventive concepts disclosed. For example, the invention may be embodied in a radar system which makes use of in-phase and quadrature detection. In this embodiment, a clutter compensator 32 would be used for each of the in-phase and quadrature detected channels. Coefficient calculator 46 might determine the values of coefficients $k_0, k_1, \ldots k_n$ by any one of a number of least mean square error minimization techniques. Alternatively, A/D converter 26 may be embodied as a sample and hold circuit which produces a series of analog voltages, and the operations of clutter compensator 32 may be performed by analog devices such as sample and hold circuits, operational amplifiers, delay lines and charge coupled devices.

Thus, because other advantages and modifications of the present invention may be possible and evident to those skilled in the art, it should be understood the present invention is limited only by the scope of the claims that follow.

What is claimed is:

1. A radar receiver wherein reflections from undesired clutter and desired moving targets are returned as a received signal, and wherein the received signal is fed to signal sampling means for providing a plurality, M, of received signal samples during a time interval, comprising:
   (a) first means for selecting a subset of N samples, where N is less than M, of the M echo signal samples;
   (b) second means, connected to receive the subset of N samples, for generating a set of coefficients of a polynomial to fit the N samples;
   (c) third means, connected to receive the set of polynomial coefficients, for generating M polynomial samples; and
   (d) subtraction means, connected to receive the M received signal samples and the M polynomial samples, for generating a compensated signal representing the received signal with reflections from the undesired clutter removed.

2. Apparatus as in claim 1 wherein said first means comprises means for selecting N samples substantially equally spaced within the time interval.

3. Apparatus as in claim 1 wherein the signal sampling means comprises means for providing the M echo signal samples substantially equally spaced within the time interval.

4. Apparatus as in claim 1 wherein said third means comprises means for generating the M polynomfal samples spaced substantially equally within the time interval.

5. Apparatus as in claim 1 wherein said second means comprises means for generating a set of coefficients to fit a cubic polynomial.

6. Apparatus as in claim 1 and additionally comprising:
   (e) fourth means, connected to receive the M echo signal samples and operably connected to the subtractor, for providing delayed echo signal samples to the subtractor.

7. A radar receiver arranged to receive a received signal, the received signal comprising components in a desired target Doppler frequency band and components in a clutter Doppler frequency band, comprising:
   (a) sampling means, fed by the received signal and operating at a predetermined sampling rate, the sampling rate sufficient to validly sample the components in the clutter band but less than a rate sufficient to validly sample a lowest frequency in the desired target band, for periodically generating a set of selected samples;
   (b) signal generator means, connected to receive the set of selected samples, for generating a clutter estimate signal substantially equal to the values of a polynomial fit through the set of selected samples; and
   (c) comparing means, connected to receive the received signal and the clutter estimate signal, for providing an estimate of the received signal components in the desired target Doppler frequency range.

8. Apparatus as in claim 7 and further comprising:
   (d) delay means, connected to receive the received signal and operably connected to the subtractor, for delaying the received signal during the operation of said means for sampling and said signal generator means.

9. A method for removing undesired components in a clutter Doppler frequency band from a received signal received by a radar receiver, the received signal comprising components in the clutter Doppler frequency band and components in a desired target Doppler frequency band, comprising the steps of:
   (a) sampling the received signal at a predetermined sampling rate to periodically provide a set of selected samples, the sampling rate sufficient to cause the components in the clutter frequency band to be validly sampled and the components in the desired target frequency band to be distributed into the clutter frequency band;
   (b) generating a clutter estimate signal from each set of selected samples, the clutter estimate signal substantially equal to the values of a polynomial fit through the selected samples; and
   (c) subtracting the received signal and the clutter estimate signal, to periodically provide an output signal indicative of the components of the echo signal in the desired target Doppler frequency range.

10. The method of claim 9 and additionally comprising, before step ( c), the step of:
   storing the received signal during said sampling and said generating steps.

* * * * *